(12) United States Patent
Teig et al.

(10) Patent No.: US 11,017,295 B1
(45) Date of Patent: May 25, 2021

(54) DEVICE STORING TERNARY WEIGHT PARAMETERS FOR MACHINE-TRAINED NETWORK

(71) Applicant: Perceive Corporation, San Jose, CA (US)

(72) Inventors: Steven L. Teig, Menlo Park, CA (US); Eric A. Sather, Palo Alto, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 844 days.

(21) Appl. No.: 15/815,251

(22) Filed: Nov. 16, 2017

Related U.S. Application Data (60) Provisional application No. 62/492,940, filed on May 1, 2017.

(51) Int. Cl.
*G06N 3/08* (2006.01)

(52) U.S. Cl.
CPC ............... *G06N 3/08* (2013.01); *G06N 3/084* (2013.01)

(58) Field of Classification Search
None
See application file for complete search history.

(56) References Cited

U.S. PATENT DOCUMENTS

| | | | |
|---|---|---|---|
| 5,255,347 A | 10/1993 | Matsuba et al. | |
| 5,477,225 A * | 12/1995 | Young | G01S 13/765 342/46 |
| 5,956,703 A | 9/1999 | Turner et al. | |
| 9,904,874 B2 | 2/2018 | Shoaib et al. | |
| 10,740,434 B1 | 8/2020 | Duong et al. | |
| 2004/0078403 A1 | 4/2004 | Scheuermann et al. | |
| 2015/0161995 A1 | 6/2015 | Sainath et al. | |
| 2017/0161640 A1 | 6/2017 | Shamir | |
| 2018/0025268 A1 | 1/2018 | Teig et al. | |
| 2018/0246855 A1 | 8/2018 | Redfern et al. | |
| 2018/0293691 A1 | 10/2018 | Nurvitadhi et al. | |
| 2018/0373975 A1 | 12/2018 | Yu et al. | |

(Continued)

OTHER PUBLICATIONS

Scope Incorporated, Final Report: Information Theory, Learning Systems, and Self-Organizing Control Systems, Mar. 31, 1967, pp. 1-51 (Year: 1967).*

(Continued)

*Primary Examiner* — Wilbert L Starks
(74) *Attorney, Agent, or Firm* — Adeli LLP (57) ABSTRACT

Some embodiments provide a set of processing units and a set of machine-readable media. The set of machine-readable media stores sets of instructions for applying a network of computation nodes to an input received by the device. The network of computation nodes includes multiple layers of nodes. The set of machine-readable media stores a set of machine-trained weight parameters for configuring the network to perform a specific function. Each layer of nodes has an associated value, and each of the weight parameters is associated with a computation node. Each weight parameter is zero, the associated value for the layer of the computation node with which the weight parameter is associated, or the negative of the associated value for the layer of the computation node with which the weight parameter is associated. Each weight value is stored using two bits or less of data.

19 Claims, 7 Drawing Sheets

(56) References Cited

U.S. PATENT DOCUMENTS

2019/0114499 A1 4/2019 Delaye et al.

OTHER PUBLICATIONS

Li, Hong-Xing, et al., "Interpolation Functions of Feedforward Neural Networks," Computers & Mathematics with Applications, Dec. 2003, 14 pages, vol. 46, Issue 12, Elsevier Ltd.

Castelli, Ilaria, et al., "Combination of Supervised and Unsupervised Learning for Training the Activation Functions of Neural Networks," Pattern Recognition Letters, Jun. 26, 2013, 14 pages, vol. 37, Elsevier B.V.

Forssell, Mats, "Hardware Implementation of Artificial Neural Networks," Information Flow in Networks, Month Unknown 2013, 4 pages.

Marchesi, M., et al., "Multi-layer Perceptrons with Discrete Weights", 1990 International Joint Conference on Neural Networks, Jun. 17-21, 1990, 8 pages, IEEE, San Diego, CA, USA.

Ravanbakhsh, Siamak, et al., "Stochastic Neural Networks with Monotonic Activation Functions," Proceedings of the 19th International Conference on Artificial Intelligence and Statistics, May 9-11, 2016, 10 pages, Cadiz, Spain.

Rojas, Raul, "The Backpropagation Algorithm," Neural Networks: A Systematic Introduction, Jul. 12, 1996, 36 pages, Springer-Verlag Berlin Heidelberg.

Shamsuddin, Siti Mariyam, et al., "Weight Changes for Learning Mechanisms in Two-Term Back Propagation Network," Artificial Neural Networks—Architectures and Applications, Jan. 2013, 31 pages, InTech.

Stelmack, Marc A., et al., "Neural Network Approximation of Mixed Continuous/Discrete Systems in Multidisciplinary Design," 36th Aerospace Sciences Meeting and Exhibit, Jan. 12-15, 1998, 16 pages, AIAA, Reno, NV, USA.

Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.

Andri, Renzo, et al., "YodaNN: An Architecture for Ultra-Low Power Binary-Weight CNN Acceleration," IEEE Transactions on Computer-Aided Design of Integrated Circuits and Systems, Mar. 14, 2017, 14 pages, IEEE, New York, NY, USA.

Ardakani, Arash, et al., "Sparsely-Connected Neural Networks: Towards Efficient VLSI Implementation of Deep Neural Networks," Proceedings of the 5th International Conference on Learning Representations (ICLR 2017), Apr. 24-26, 2017, 14 pages, ICLR, Toulon, France.

Bang, Suyoung, et al., "A 288µW Programmable Deep-Learning Processor with 270KB On-Chip Weight Storage Using Non-Uniform Memory Hierarchy for Mobile Intelligence," Proceedings of 2017 IEEE International Solid-State Circuits Conference (ISSCC 2017), Feb. 5-7, 2017, 3 pages, IEEE, San Francisco, CA, USA.

Bruns, Erich, et al., "Mobile Phone-Enabled Museum Guidance with Adaptive Classification," IEEE Computer Graphics and Applications, Jul. 9, 2008, 5 pages, vol. 28, Issue 4, IEEE.

Courbariaux, Matthieu, et al., "Binarized Neural Networks: Training Neural Networks with Weights and Activations Constrained to +1 or −1," Mar. 17, 2016, 11 pages, arXiv:1602.02830v3, Computing Research Repository (CoRR)—Cornell University, Ithaca, NY, USA.

Courbariaux, Matthieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.

Duda, Jarek, "Asymmetric Numeral Systems: Entropy Coding Combining Speed of Huffman Coding with Compression Rate of Arithmetic Coding," Jan. 6, 2014, 24 pages, arXiv:1311.2540v2, Computer Research Repository (CoRR)—Cornell University, Ithaca, NY, USA.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Gao, Mingyu, et al., "TETRIS: Scalable and Efficient Neural Network Acceleration with 3D Memory," Proceedings of the 22nd International Conference on Architectural Support for Programming Languages and Operating Systems (ASPLOS '17), Apr. 8-12, 2017, 14 pages, ACM, Xi'an, China.

Guo, Yiwen, et al., "Network Sketching: Exploring Binary Structure in Deep CNNs," 2017 IEEE Conference on Computer Vision and Pattern Recognition (CVPR 2017), Jul. 21-26, 2017, 9 pages, IEEE, Honolulu, HI.

He, Zhezhi, et al., "Optimize Deep Convolutional Neural Network with Ternarized Weights and High Accuracy," Jul. 20, 2018, 8 pages, arXiv:1807.07948v1, Computing Research Repository (CoRR)—Cornell University, Ithaca, NY, USA.

Hegde, Kartik, et al., "UCNN: Exploiting Computational Reuse in Deep Neural Networks via Weight Repetition," Proceedings of the 45th Annual International Symposium on Computer Architecture (ISCA '18), Jun. 2-6, 2018, 14 pages, IEEE Press, Los Angeles, CA, USA.

Jain, Anil K., et al., "Artificial Neural Networks: A Tutorial," Computer, Mar. 1996, 14 pages, vol. 29, Issue 3, IEEE.

Karan, Oguz, et al., "Diagnosing Diabetes using Neural Networks on Small Mobile Devices," Expert Systems with Applications, Jan. 2012, 7 pages, vol. 39, Issue 1, Elsevier, Ltd.

Leng, Cong, et al., "Extremely Low Bit Neural Network: Squeeze the Last Bit Out with ADMM," Proceedings of 32nd AAAI Conference on Artificial Intelligence (AAAI-18), Feb. 2-7, 2018,16 pages, Association for the Advancement of Artificial Intelligence, New Orleans, LA, USA.

Li, Fengfu, et al., "Ternary Weight Networks," May 16, 2016, 9 pages, arXiv:1605.04711v1, Computing Research Repository (CoRR)—Cornell University, Ithaca, NY, USA.

Louizos, Christos, et al., "Bayesian Compression for Deep Learning," Proceedings of Advances in Neural Information Processing Systems 30 (NIPS 2017), Dec. 4-9, 2017, 17 pages, Neural Information Processing Systems Foundation, Inc., Long Beach, CA, USA.

Merolla, Paul, et al., "Deep Neural Networks are Robust to Weight Binarization and Other Non-linear Distortions," Jun. 7, 2016, 10 pages, arXiv:1606.01981v1, Computing Research Repository (CoRR)—Cornell University, Ithaca, NY, USA.

Non-published commonly owned U.S. Appl. No. 15/815,222, filed Nov. 16, 2017, 38 pages, Perceive Corporation.

Non-published commonly owned U.S. Appl. No. 15/815,235, filed Nov. 16, 2017, 36 pages, Perceive Corporation.

Rastegari, Mohammad, et al., "XNOR-Net: ImageNet Classification Using Binary Convolutional Neural Networks," Proceedings of 2016 European Conference on Computer Vision (ECCV '16), Oct. 8-16, 2016, 17 pages, Lecture Notes in Computer Science, vol. 9908, Springer, Cham, Amsterdam, Netherlands.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

* cited by examiner

DEVICE STORING TERNARY WEIGHT PARAMETERS FOR MACHINE-TRAINED NETWORK

BACKGROUND

Machine learning automates the creation, based on historical data, of models that can then be used to make predictions. A class of models called deep neural networks (or DNNs) has become popular over the last few years, and there is now a menagerie of types of DNNs. Some examples of DNN's include feed-forward, convolutional, recurrent, long-short term memory (LSTM), and Neural Turing Machines (NTM).

Neural networks typically involve many (e.g., thousands, millions, or even potentially billions) of weights that are calculated during training and then used when the neural network is embedded into a device. These weights are generally floating-point values (e.g., 32-bit values), such that in total they occupy a large amount of memory. As such, these weight values are often stored on a separate memory located off of the processor that runs the neural network and, at runtime, are ported in from this memory. This import of large weight values is a major consumer of power for the processor.

Furthermore, each floating-point weight value is typically multiplied with another input value as part of the neural network calculations. These multiplications are another source of significant power consumption for the processor. Techniques that allow for lower power consumption without a reduction in the effectiveness of a neural network would represent an important step forward in the art.

BRIEF SUMMARY

Some embodiments of the invention provide a novel method for training a multi-layer node network that results in weights used by the nodes being assigned only a discrete set of values. The multi-layer network of some embodiments includes a layer of one or more input nodes, a layer of one or more output nodes, and one or more layers of hidden (interior) nodes. Each node in the multi-layer network produces an output value based on one or more input values. Specifically, each hidden node and output node, in some embodiments, bases the output value on the output values of a set of other nodes (e.g., the set of nodes of the previous layer). In some embodiments, each node includes (i) a linear component that uses a set of weight values to linearly combine the input values of the node to produce an intermediate result and (ii) a non-linear component that applies a non-linear function to the intermediate result to calculate the output value for the node.

During training of the network, the weight values are adjusted to arrive at a trained network that produces optimal outputs for any input value. The multi-layer network may be designed to perform a specific function when embedded in a device (e.g., a mobile device such as a smart phone, an Internet of Things (IOT) device such as a smart refrigerator, baby monitor, etc., or other devices). Such functions can include face recognition, voice recognition, identification of types of objects in images, large-scale data analysis, etc.).

Some embodiments train the multi-layer network in such a way as to arrive at a set of discrete values for the weights. Specifically, during training, some embodiments add a continuously-differentiable term to the loss function for the multi-layer network that biases training of the weights toward a set of discrete values. Rather than simply training the network and then rounding the weights to the nearest discrete value in a pre-defined set, augmenting the loss function with the additional continuously-differentiable term forces the training of the weights towards the discrete values while also increasing the likelihood of arriving at the optimal discrete value for each weight. Some embodiments use either a standard Lagrangian term or an augmented Lagrangian as the additional term in the loss function.

To train the multi-layer network, some embodiments first propagate a set of inputs through the network, with each input generating a set of outputs. Some embodiments perform training with a large number of different inputs, as this can help train the weight values for an average input. Each input (e.g., an image, a voice snippet, etc.) propagates through the network, with each layer of nodes receiving their one or more inputs and generating an output to pass to the next layer of nodes. In the final output layer, one or more nodes receives the outputs from the previous layer and generates the outputs. The standard loss function measures the difference between the output for a particular input and a predefined expected, or optimal, output for that input.

In typical training, the gradient of the loss function is back propagated through the network in a process that determines, for each weight, the rate of change of the loss function with respect to a change of the weight at the current value of the loss function. The backpropagation process uses the chain rule for partial derivatives to isolate the partial derivative of the loss function with respect to each individual weight used in the multi-layer network, and assign a value to this partial derivative for the current value of the loss function. Thus, this process identifies the relative effect on the loss function of changes to the many different weights used to generate the outputs of the network. These gradients are used to update the weight values by moving the weight values in the direction opposite the gradient (to attempt to reduce the loss function value) by a particular amount, with a larger gradient for a particular weight resulting in a greater change to that weight.

As mentioned, to bias the training towards a set of discrete values for each weight (i.e., so that the resultant weight will be one of the set of discrete values), some embodiments add an additional term to the loss function. In some embodiments, this additional term is actually an amalgamation (e.g., a summation) of terms for each weight used in the multi-layer network. The additional term for a particular weight, in some embodiments, uses a function that evaluates to zero when the weight is one of the set of discrete values desired for that weight. For instance, if the set of discrete values for a particular weight are 1, 0, and −1, some embodiments use the weight multiplied by 1 minus the absolute value of the weight as this function. The full term introduced as an addition to the loss function, in some embodiments, is this function multiplied by a variable Lagrange multiplier (i.e., making the sum of the loss function and the additional term a Lagrangian function). Some embodiments, either additionally or alternatively, use an augmented Lagrangian term that is a quadratic of the original function. In this case, the first (standard Lagrangian) term provides for faster convergence to one of the desired discrete values, while the second (augmented Lagrangian) term provides for a better guarantee of convergence to one of these discrete values.

Some embodiments use multiple sets of training inputs, or repeat the same training set for each training iteration through the network. In addition, some embodiments, after either each training set or after several training sets, gradually increase the effect of the additional biasing term on the overall loss function. Specifically, some embodiments modify the Lagrangian term after each set of several training sets, either linearly or according to a formula (e.g., based on how far away from the desired discrete values the weights are).

As mentioned, some embodiments use the ternary options of 1, 0, and −1 as the set of discrete values for each weight used in the multi-layer network. Other embodiments use only a binary approach of 0 and 1, while still other embodiments use a larger number of discrete candidate values (i.e., four or more discrete candidates for at least some of the weights). Some embodiments use the same set of discrete values for each weight within a particular layer, but with the sets of discrete values varying between layers. For instance, some embodiments assign a value to each layer (e.g., a number between 0 and 1, or any positive number), with the set of discrete values for each particular layer being 0, the value assigned to the particular layer, and the negative of the value assigned to the particular layer. In this case, some embodiments normalize the candidate values to 1, 0, and −1 during training, while adjusting the function used by each node at the layer to account for this normalization (e.g., by dividing the non-linear component by the value assigned to the particular layer).

By using a set of discrete values, the use of expensive floating-point values (i.e., that use a large number of bits) for the weights in the multi-layer network as embedded into a physical device (e.g., on a processor) can be avoided. Instead, 1 or 2 bit values (if the options are 1, 0, and −1) may be used, which saves large amounts of memory in the aggregate, especially for networks that may have millions or even billions of weights. For example, ten million 32-bit values may be too large to store on a processing unit (e.g., of a smart phone, an IOT device, etc.) and would thus need to be stored in a separate memory and imported onto the processor at runtime, which uses input/output (I/O) bandwidth and thus power. If 1 and 2 bit values are used, however, this enables the data to be stored on the processor in some embodiments, thereby providing major power savings. To provide additional reduction in the overall data size, some embodiments use an additional constraint that requires that at least a particular percentage (e.g., 60%, 70%, etc.) of the weight values for a network be 0 (rather than −1 or 1).

Furthermore, when using floating-point or even variable-size weight values, the linear component of a node multiplies each input by its corresponding weight value. If all of the weight values are 1, 0, or −1, then this multiplication can be avoided and addition/subtraction used instead. Even if the positive/negative weight value for each layer of nodes is a value between 0 and 1 (or greater than 1), then this addition/subtraction technique can be used with one multiplication operation performed at the end. Because addition and subtraction is computationally easier than multiplication, this provides additional savings in processor resource consumption (and therefore power consumption).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention provide a novel method for training a multi-layer node network that results in weights used by the nodes being assigned only a discrete set of values. The multi-layer network of some embodiments includes a layer of one or more input nodes, a layer of one or more output nodes, and one or more layers of hidden nodes. Each node in the multi-layer network produces an output value based on one or more input values. Specifically, each hidden node and output node, in some embodiments, bases the output value on the output values of a set of other nodes (e.g., the set of nodes of the previous layer). In some embodiments, each node includes (i) a linear component that uses a set of weight values to linearly combine the input values of the node to produce an intermediate result and (ii) a non-linear component that applies a non-linear function to the intermediate result to calculate the output value for the node.

During training of the network, the weight values are adjusted to arrive at a trained network that produces optimal outputs for any input value. The multi-layer network may be designed to perform a specific function when embedded in a device (e.g., a mobile device such as a smart phone, an Internet of Things (IOT) device such as a smart refrigerator, baby monitor, etc., or other devices). Such functions can include face recognition, voice recognition, identification of types of objects in images, large-scale data analysis, etc.).

Figure 1:
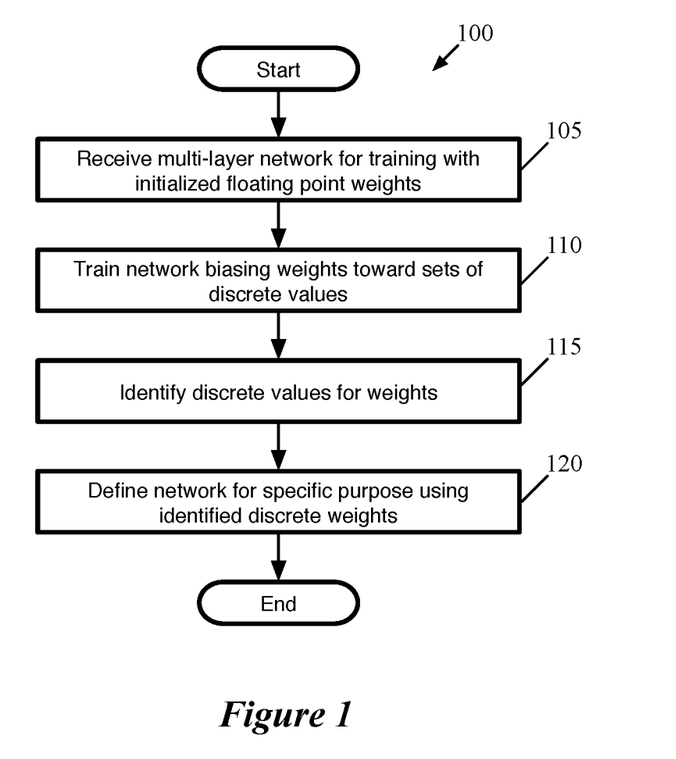
FIG. 1 conceptually illustrates a process of some embodiments for training a multi-layer network to execute a specific purpose, with the weight values used by the network belonging to a small discrete set of values.

FIG. 1 conceptually illustrates a process 100 of some embodiments for training a multi-layer network to execute a specific purpose, with the weight values used by the network belonging to a small discrete set of values (rather than, e.g., large floating-point weight values). The process, in some embodiments, is performed by a network optimization application, which may be a program executing on a single device (e.g., a single laptop or desktop, a mobile device, etc.) or a distributed application that operates on multiple machines (e.g., on multiple virtual machines within a datacenter).

Figure 2:
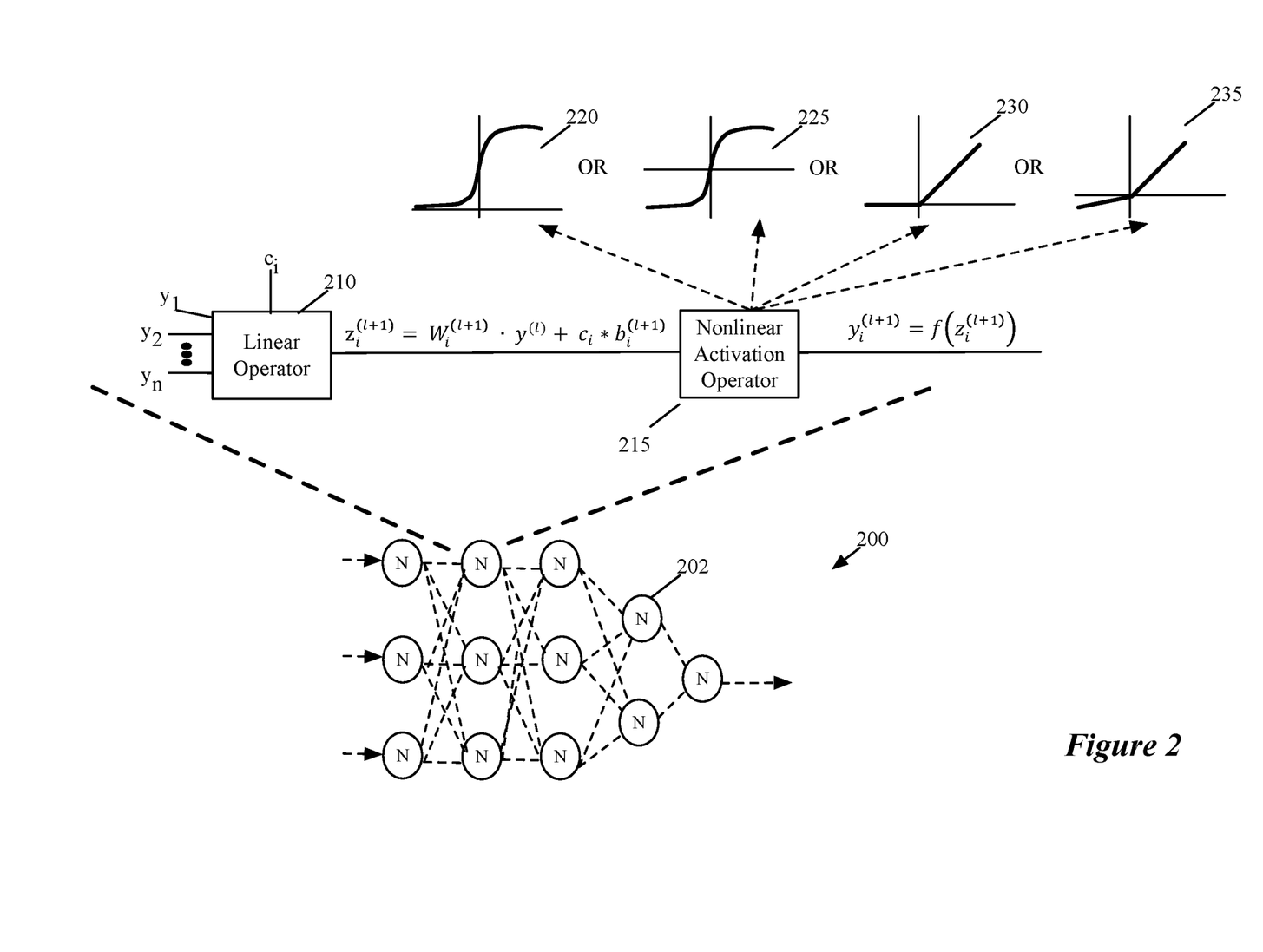
FIG. 2 illustrates an example of a multi-layer machine-trained network of some embodiments.

As shown, the process 100 receives (at 105) a multi-layer network for training with initialized floating-point weights. As mentioned, the multi-layer network of some embodiments is made up of numerous nodes that produce output values based on one or more input values. Each of the hidden and output nodes includes a linear component that uses a set of weight values to linearly combine the input values of the node, as well as a non-linear component that uses the output of the node's linear component to compute the output value for the node. FIG. 2, described below, illustrates an example of such a multi-layer network and the operation of one of its nodes.

The process then trains (at 110) the network while biasing the weights towards sets of discrete values. Specifically, some embodiments add a continuously-differentiable term to the loss function for the network that biases training of each weight toward a set of discrete values. The loss function (also referred to as the error function) of a multi-layer network is a function that measures the difference of the actual output of the network for a particular input and a pre-defined expected output. Rather than simply training the network and then rounding the weights to the nearest discrete value in a pre-defined set, augmenting the loss function with the additional continuously-differentiable term forces the training of the weights towards the discrete values while also increasing the likelihood of arriving at the optimal discrete value for each weight. Some embodiments use either a standard Lagrangian term or an augmented Lagrangian as the additional term in the loss function. The training process is described in further detail below by reference to FIG. 4.

Next, the process 100 identifies (at 115) the discrete values for the weights. These are the result of the training process. The process then defines (at 120) a network for a specific purpose using the identified discrete weights. As mentioned, these purposes may include face recognition or other image analysis, voice recognition or other audio analysis, large-scale data analysis (e.g., for climate data), etc. The multi-layer network may be designed to operate on a smart phone, IOT device, etc. By using a set of discrete values, large floating-point values for the weights are avoided. Instead, 1 or 2 bit values (e.g., if all of the weight values are 1, 0, and −1) may be used, which saves large amounts of memory in the aggregate, especially for networks that may have millions or even billions of weights. For example, ten million 32-bit values may be too large to store on a processing unit (e.g., of a smart phone, an IOT device, etc.) and would thus need to be stored in a separate memory and imported onto the processor at runtime, which uses input/output (I/O) bandwidth and thus power. If 1 and 2 bit values are used, however, this enables the data to be stored on the processor (e.g., in the memory closest to the processor) in some embodiments, thereby providing major power savings.

FIG. 2 illustrates an example of a multi-layer machine-trained network of some embodiments. This figure illustrates a feed-forward neural network 200 that has multiple layers of processing nodes, called neurons 202. In all but the first (input) and last (output) layer, each neuron 202 receives two or more outputs of neurons from earlier processing node layers and provides its output to one or more neurons in subsequent layers. The output of the neuron in the last layer represents the output of the network 200. In some embodiments, the output of the network 200 is a number in a range of values (e.g., 0 to 1). In this example, the neural network 200 only has one output node. Other neural networks of other embodiments have several output nodes that provide more than one output value. In addition, the neural networks of other embodiments may be types of networks other than feed forward networks (e.g., recurrent networks, etc.).

As shown in FIG. 2, each neuron in neural network 200 has a linear component 210 and a nonlinear component 215. The linear component 210 of each hidden or output neuron in this example computes a dot product of a vector of weight coefficients and a vector of output values of prior nodes, plus an offset. In other words, a hidden or output node's linear operator computes a weighted sum of its inputs (which are outputs of the previous stage neurons that the linear operator receives) plus an offset. Similarly, the linear component 210 of each input neuron of some embodiments computes a dot product of a vector of weight coefficients and a vector of input values, plus an offset. In other embodiments, each input neuron receives a single input and passes that input as its output. Each neuron's nonlinear component 215 computes a function based on the output of the neuron's linear component 210. This function is commonly referred to as the activation function.

The notation of FIG. 2 can be described as follows. Consider a neural network with L hidden layers (i.e., L layers that are not the input layer or the output layer). The variable l can be any of the hidden layers (i.e., $l \in \{1, \ldots, L-1\}$ index the hidden layers of the network, with l=0 representing the input layer and l=L representing the output layer). The variable $z_i^{(l+1)}$ represents the output of the linear component of a hidden neuron i in layer l+1. As indicated by the following Equation (A), the variable $z_i^{(l+1)}$ is computed as the dot product of a vector of weight values $W_i^{(l+1)}$ and a vector of outputs $y^{(l)}$ from layer l plus an offset that is computed as a constant value $c_i$ times a weight value bi, typically referred to as a bias.

$$z_i^{(l+1)} = W_i^{(l+1)} \cdot y^{(l)} + c_i * b_i^{(l+1)} = \sum_{k=1}^{n} \left( w_{ik}^{(l+1)} * y_k^{(l)} \right) + c_i * b_i^{(l+1)} \quad (A)$$

The constant value $c_i$ is a value to which all the weight values are normalized. In some embodiments, the constant value $c_i$ is 1. The symbol * is an element-wise product, while the symbol · is the dot product. The weight coefficients $W^{(l)}$ are parameters that can be adjusted during the network's training in order to configure this network to solve a particular problem.

The output $y^{(l+1)}$ of the nonlinear component 215 of a neuron in layer l+1 is a function of the neuron's linear component, and can be expressed as by Equation (B) below.

$$y_i^{(l+1)} = f(z_i^{(l+1)}) \quad (B)$$

In this equation, $f$ is the nonlinear activation function for node i. Examples of such activation functions include a sigmoid function 220 ($f(x)=1/(1+e^{-x})$), a tan h function 225, a ReLU (rectified linear unit) function 230 or a leaky ReLU function 235, as shown.

Traditionally, the sigmoid function and the tan h function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions and periodic functions.

Equation (B) can be expressed in the following expanded format of Equation (C).

$$y_i^{(l+1)} = f(z_i^{(l+1)}) = f\left[\left(\sum_{k=1}^{n} w_{ik} * y_k\right) + c_i * b_i^{(l+1)}\right] \quad (C)$$

In this equation, $w_{ik}$ are weight values associated with the inputs $y_k$ of the neuron i in layer l+1.

Before a multi-layer network can be used to solve a particular problem, the network has to be put through a supervised training process that adjusts the network's configurable parameters (e.g., the weight coefficients of its linear components). The training process iteratively selects different input value sets with known output value sets. For each selected input value set, the training process typically (1) forward propagates the input value set through the network's nodes to produce a computed output value set, and then (2) back propagates a gradient (rate of change) of a loss function (output error) that quantifies the difference between the input set's known output value set and the input set's computed output value set, in order to adjust the network's configurable parameters (e.g., the weight coefficients). As mentioned, some embodiments introduce an additional term that biases the training of the weight coefficients towards a discrete set of values (e.g., −1, 0, and 1).

Figure 3:
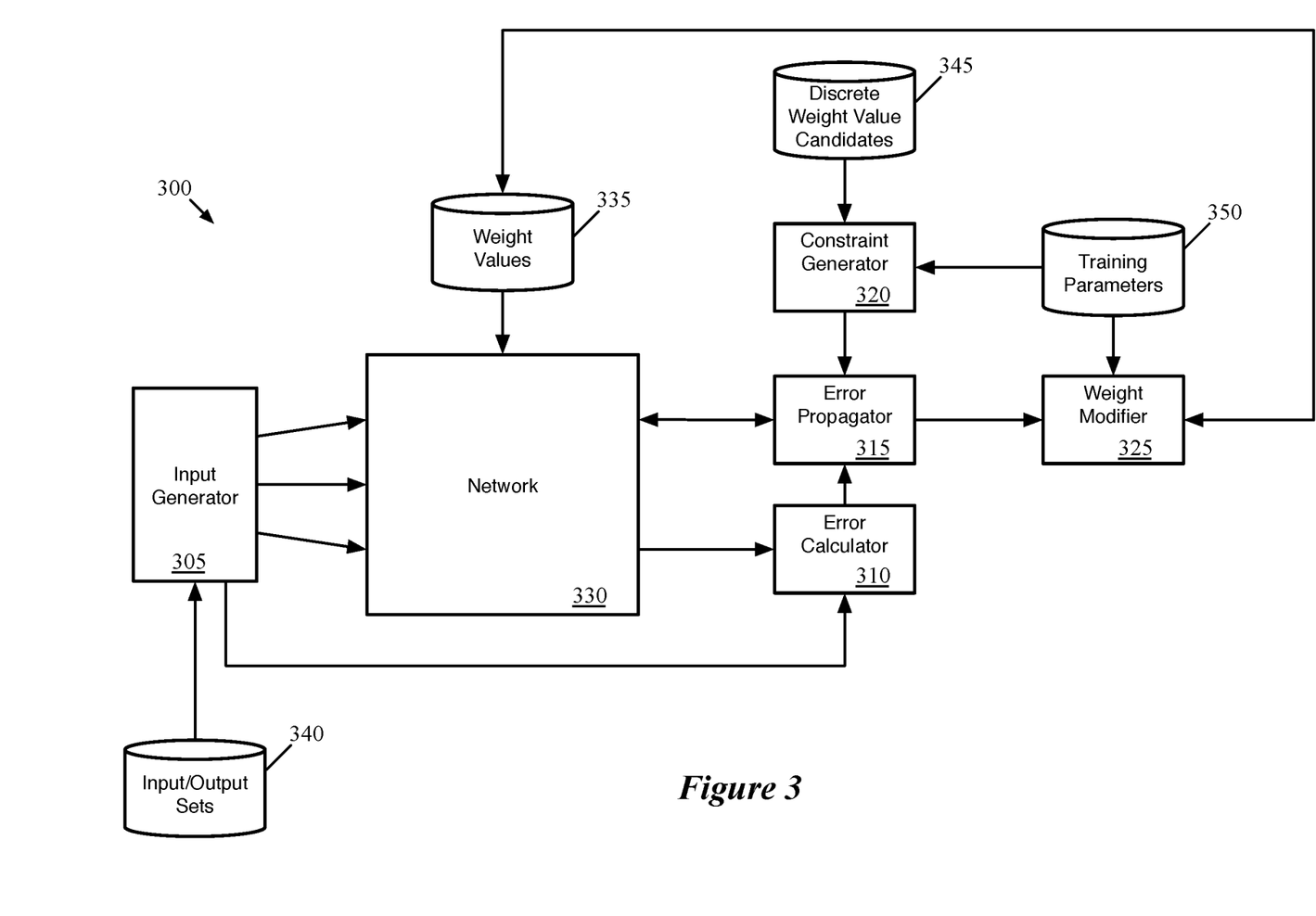
FIG. 3 conceptually illustrates a training system of some embodiments that introduces additional biasing terms to push weight coefficients towards discrete sets of values.

FIG. 3 conceptually illustrates a training system 300 of some embodiments that introduces the additional biasing terms to push the weight coefficients towards discrete sets of values. The training system 300 uses a set of discrete weight value candidates (which may be the same for all nodes in a network being trained, different for each layer of nodes, or different for each node in the network) to generate additional biasing terms used in the training, in order to push the trained weight values towards those discrete values. The resulting discrete weight values are used for the multi-layer machine-trained network when embedded in a device.

As shown, the system 300 includes an input generator 305, an error calculator 310, an error propagator 315, a constraint generator 320, and a weight modifier 325. In some embodiments, all of these modules execute on a single device, such as a server, a desktop or laptop computer, a mobile device (e.g., a smartphone, tablet, etc.), a virtual machine, etc. In other embodiments, these modules may execute across multiple interconnected devices (or virtual machines), or separate instances may execute on multiple devices (or virtual machines) for additional computing power).

Figure 4:
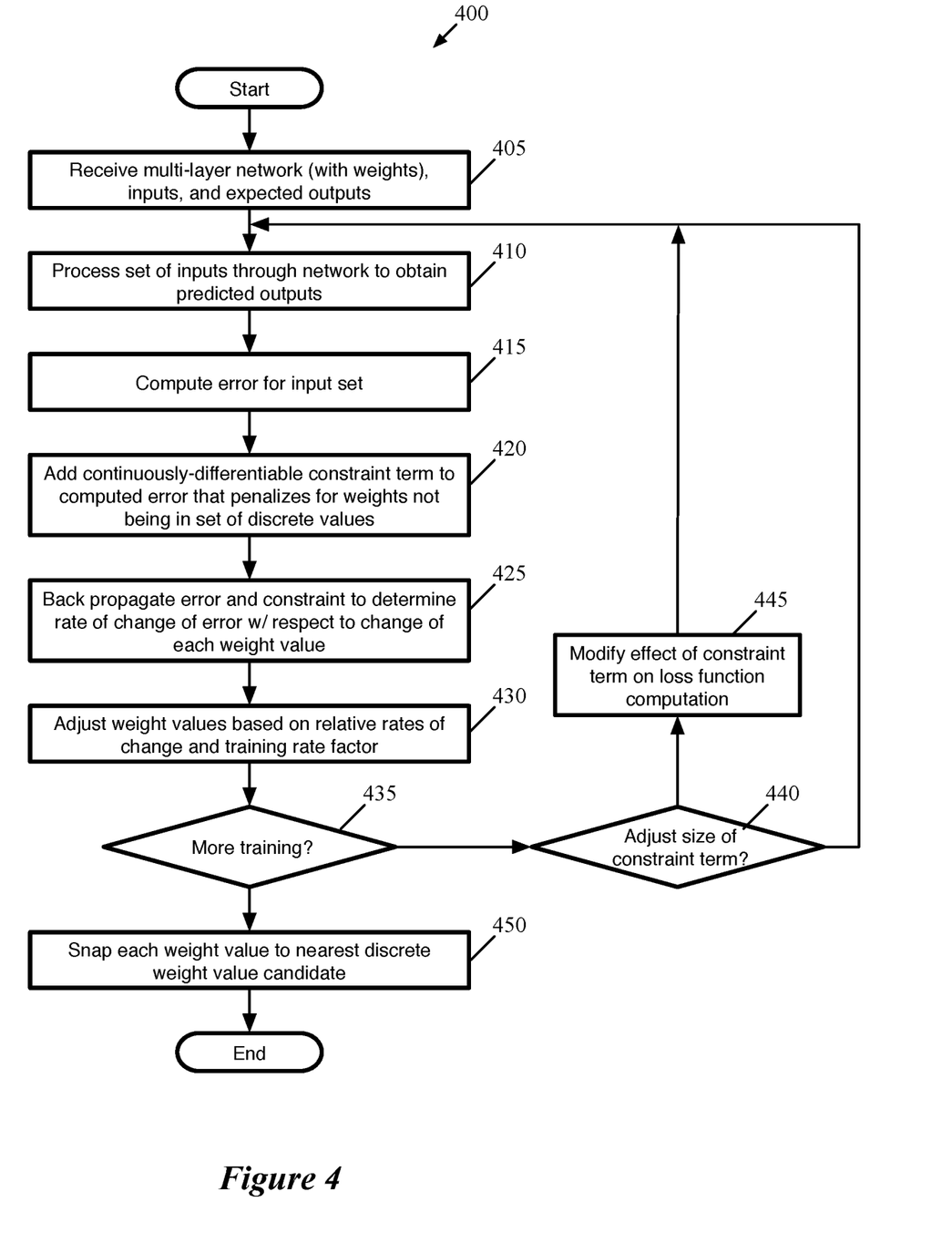
FIG. 4 conceptually illustrates a training process of some embodiments performed by the training system of FIG. 3.

FIG. 4 conceptually illustrates a training process 400 of some embodiments performed by the training system 300 (or a similar system). As shown, the process 400 begins by receiving (at 405) a multi-layer network (including initial weight values), inputs for the network, and expected outputs for these inputs. The network 330 of some embodiments is a multi-layer machine-trained network (e.g., a feed-forward neural network), such as that shown in FIG. 2. It includes multiple layers of nodes, including a layer of input nodes, at least one layer of hidden nodes, and a layer of output nodes. Each hidden node and output node includes a linear component (that uses the weight values 335) and a non-linear activation function. The network 330 receives an input and generates a corresponding output.

The weight values 335 are used to parametrize the network, and are trained by the system 300 for the network to perform a particular task. In some embodiments, these weights are initialized using a probabilistic distribution for each layer. That is, in some embodiments, the weights within each layer are selected randomly from a Gaussian distribution, the width of which may depend on the range of possible discrete values for that layer.

As described in more detail below, in some embodiments the possible candidate weight values for each weight in the network are −1, 0, and 1. In other embodiments, the candidate values are different for each layer of the network, with the candidate set being $\{-\alpha_k, 0, +\alpha_k\}$ for each layer k. In this case, however, the weights can be normalized to the scale of $\{-1, 0, +1\}$. During the process, continuous weight values from −1 to 1 are used, with these values treated as a probabilistic combination of the adjacent discrete candidate weights. Thus, a negative weight value is a probabilistic combination of −1 and 0, while a positive weight value is a probabilistic combination of 0 and 1.

In some embodiments, during forward propagation, each weight is randomly rounded to one of its neighboring discrete candidate values, such that the expectation value of the weight is its continuous value. For instance, the value 0.3 would be randomly rounded to either 0 or 1, with a 70% chance of being rounded to 0 and a 30% chance of being rounded to 1.

For the inputs, some embodiments perform training with a large number of different inputs, as this can help train the weight values for an average input. Each input in an input set may be an image, a voice snippet, etc. that is to be propagated through the network, depending on the specific purpose for which the network is being trained. For example, if a network is being trained to identify whether an image includes a face or not, the set of inputs will include numerous images, some of which have faces and some of which do not, probably including various types of edge cases (e.g., images where the face is distorted, where objects partially appear in front of the face, etc.). Each input also has a corresponding output that is what the network should generate as its output when presented with that input.

The input generator 305 selects a set of inputs (and corresponding outputs) from the sets of inputs and outputs 340. In addition, in some embodiments, the input generator 305 breaks up the inputs into constituent values to be fed into the input layer of the network 330. For instance, for a network being trained for face recognition, the input generator might simply divide the pixels into several sections, or might perform computations based on the pixel values and feed these to the input layer (e.g., the percentage of red pixels in the image, the average red value of each pixel, or other statistics). That is, based on the input (e.g., an image), the input generator 305 might perform a set of computations in order to generate the inputs for the input layer of the network 330.

Next, the network 330 processes (at 410) the set of inputs through the network to obtain predicted outputs (i.e., outputs predicted according to the current state of the network 330). Each input propagates through the processing nodes of the network 330, with each layer of nodes receiving their one or more inputs and generating an output to pass to the next layer of nodes. In the final output layer, one or more nodes receives the outputs from the previous layer and generates the outputs of the network. In some embodiments, this processing entails, for each node, the linear component first computing a weighted sum of its input values (according to the current weight values 335), and then the non-linear activation function computing an output based on this weighted sum.

The error calculator 310 then computes (at 415) the error for the input set. In some embodiments, the error calculator 310 computes the error for each individual input as the network 330 generates its output. The error calculator 310 receives both the predicted output from the input generator 305 and the output of the network 330, and uses a loss function that quantifies the difference between the predicted output and the actual output for each input. Some embodiments compute this as a simple difference, or absolute value of the difference, between the two values; other embodiments compute the square of the differences, or other such measure. In addition, some embodiments sum or average the loss function value for each input in a set of inputs. This calculated error is passed to the error propagator 315 in some embodiments.

The process 400 (e.g., the error propagator 315) adds (at 420) a continuously-differentiable constraint term to the computed error. This constraint term penalizes (i.e., adds to the loss function computation) for weight values that do not belong to their set of discrete values; in some embodiments, the further from one of the discrete values the current weight is, the greater the penalty. In some embodiments, this additional term is actually an amalgamation (e.g., a summation) of terms for each weight used in the multi-layer network. The additional term for a particular weight, in some embodiments, uses a function that evaluates to zero when the weight is one of the set of discrete values desired for that weight. For instance, if the set of discrete values for a particular weight $w_{ik}$ are 1, 0, and −1, some embodiments use $h(w_{ik})=w_{ik}*(1-|w_{ik}|)$ as this function. The full term introduced as an addition to the loss function, in some embodiments, is this penalty function (whether the previous example or a different function) multiplied by a variable Lagrangian multiplier (i.e., making the additional function a Lagrangian function), $\lambda_{ik}h(w_{ik})$. Some embodiments, either additionally or alternatively, use an augmented Lagrangian term that is a quadratic of the original function (e.g., $h(w_{ik})^2$). The full augmented loss function $\mathcal{L}$ used in some embodiments is the following.

$$\mathcal{L} = l + \sum_{ik} \lambda_{ik} h(w_{ik}) + \frac{c_k}{2} \sum_i h(w_{ik})^2 = \quad (D)$$

$$l + \frac{1}{2c_k} \sum_i [\lambda_{ik} + c_k h(w_{ik})]^2 + \text{constant}$$

In these equations, l is the standard loss function without any constraints, and $c_k$ is a quadratic penalty coefficient for all weights $w_{ik}$ in the layer k. In this case, the first (standard Lagrangian) term provides for faster convergence to one of the desired discrete values, while the second (augmented Lagrangian) term provides for a better guarantee of convergence to one of these discrete values.

The constraint generator 320 uses the discrete weight value candidates 345 (e.g., the candidates for each layer) and training parameters 350 (e.g., the value to use for each $\lambda_{ik}$ in the Lagrangian term), any constants for use in the Lagrangian terms, and generates the continuously-differentiable constraint terms for use by the error propagator 315. The error propagator 315, as mentioned, adds these terms to the standard loss function.

Next, the error propagator 315 back propagates (at 425) the error (including the constraints) to determine the rate of change of the error with respect to a change of each weight value. In typical training (i.e., without the additional penalty functions), the loss function is back propagated through the network in a process that determines, for each weight, the rate of change of the loss function with respect to a change in the weight at the current value of the loss function. The backpropagation process uses the chain rule for partial derivatives to isolate the partial derivative of the loss function with respect to each individual weight used in the multi-layer network, and assign a value to this partial derivative for the current value of the loss function. Thus, this process identifies the relative effect on the loss function of changes to the many different weights used to generate the outputs of the network.

Specifically, if L is the combined loss function (including the penalty terms), then the backpropagation computes, for each weight $w_{ik}$, the partial derivative $$\frac{\partial L}{\partial w_{ik}}.$$

Because the weights are isolated in a node's output computation as well as in the easily-differentiable Lagrangian constraint terms, computing these partial derivatives is not difficult via application of the chain rule. In this sense, the loss function (with or without the Lagrangian terms) is a function in many-dimensional space (i.e., with the various weight coefficient values being the many dimensions), and the nature of the function means that the effect of each weight value can be easily isolated for a given loss function value.

Returning to the process 400, the weight modifier 325 adjusts (at 430) the weight values based on the relative rates of change and a training rate factor. That is, the error propagator 315 provides, for each weight value $w_{ik}$, the partial derivative of the loss function with respect to that $w_{ik}$. These partial derivatives are used to update the weight values by moving the weight values in the direction opposite the gradient (to attempt to reduce the loss function value) by a particular amount, with a larger partial derivative for a particular weight (i.e., a component of the gradient) resulting in a greater change to that weight. The weight modifier 325 uses a training rate factor from the training parameters 350 to determine how much to change the weight values based on the instantaneous gradient components. That is, the gradient component for a particular weight provides an amount to move (in the direction opposite to the gradient component, as the goal is to minimize the loss function) that weight value relative to the other weight values, while the training rate specifies the distance of that move. Specifically, for each weight value $w_{ik}$, with a learning rate r, the weight modifier updates this weight value using the following equation.

$$w_{ik(updated)} = w_{ik} - \left(r * \frac{\partial L}{\partial w_{ik}}\right) \quad (E)$$

After updating the weights, the process 400 determines (at 435) whether to perform more training. Some embodiments use a minimization process (e.g., a stochastic gradient descent minimizer) to determine when to stop training the network. In some embodiments, the system 300 only stops training the network once (i) all of the weights are within a particular threshold of one of their discrete candidate values (e.g., 1%) and (ii) the weights have changed by less than a threshold for a particular number of training iterations. In some embodiments, the input generator determines whether to perform more training; in other embodiments, a different module (e.g., a module not shown in FIG. 3 makes this determination).

If more training is required, the process 400 determines (at 440) whether to adjust the size of the constraint term. If needed, the process modifies (at 445) the size of the constraint term in the loss function computation (e.g., to increase the effect of this term) and returns to 410 to process a set of inputs (e.g., the same set of inputs or a different set of inputs). Some embodiments perform one or more training iterations with a particular constraint term, then gradually enlarge this term, so as to more forcefully push the weights to one of their candidate discrete values. That is, some embodiments update the Lagrangian term after each set of several training sets, either linearly or according to a formula (e.g., based on how far away from the desired discrete values the weights are).

Specifically, some embodiments perform the training in a sequence of iterations, during each of which the current augmented loss function shown in equation D is minimized over the weight values (and any other trained parameters that affect the network) with the Lagrangian multipliers and penalty coefficients held constant. At the end of the nth iteration, the Lagrangian multiplier and quadratic penalty coefficients for the various weights $w_{ik}$ are updated based on the extent to which the weight is in violation of its constraint:

$$\lambda_{ik}^{(n+1)} = \lambda_{ik}^{(n)} + c_k^{(n)} h(w_{ik}^{(n)}) \qquad (F)$$

In addition, if the constraint functions are not converging fast enough (e.g., as measured by the norm of the vector of constraint violations, $\|h\|$), some embodiments also update the quadratic-penalty coefficient using the formula (with $\gamma > 1$):

$$c_k^{(n+1)} = \gamma c_k^{(n)}, \qquad (G)$$

Once the system 300 determines that no more training is required, the process 400 of some embodiments snaps (at 450) each weight value to its nearest candidate discrete weight value. By using the increasing Lagrangian penalty term, the trained floating-point weights should already be very close to, if not equal to, one of their candidate discrete values.

As mentioned, some embodiments use the ternary options of 1, 0, and −1 as the set of discrete values for each weight used in the multi-layer network. Other embodiments use only a binary approach of 0 and 1. Some embodiments use the same set of discrete values for each weight within a particular layer, but with the sets of discrete values varying between layers. For instance, some embodiments assign a value $\alpha_k$ to each layer (e.g., a number between 0 and 1, or any positive number), with the set of discrete values for each particular layer being 0, $\alpha_k$, and $-\alpha_k$. In this case, some embodiments still treat the values as 1, 0, and −1, while adjusting the function used by each node at the layer to account for this scaling (e.g., by dividing the non-linear component by the value assigned to the particular layer). To determine $\alpha_k$ for a particular layer, some embodiments use the maximum of the initial weights $w_{ik}$ for that layer.

Figure 5:
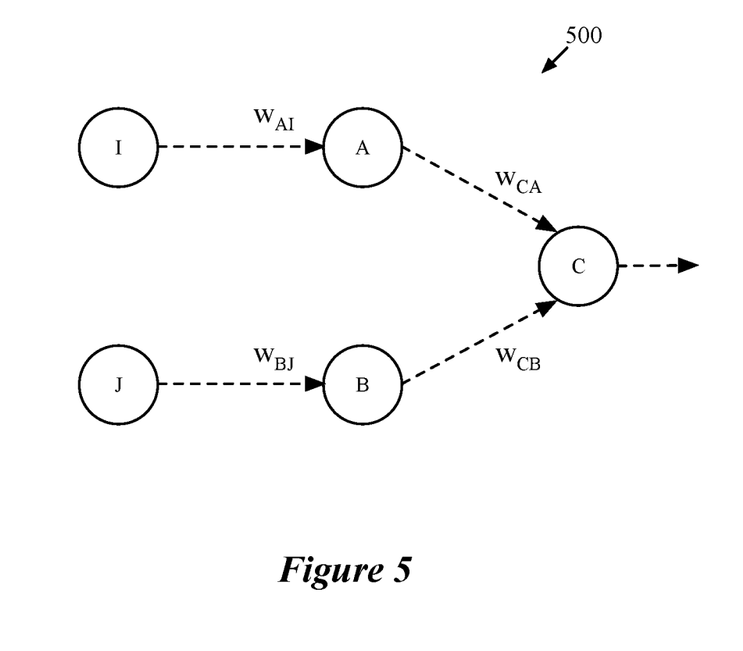
FIG. 5 illustrates a simple feed-forward neural network with one hidden layer having two nodes, and a single output layer with one output node.

FIG. 5 illustrates a simple feed-forward neural network 500 with one hidden layer having two nodes, and a single output layer with one output node. This network 500 is used to provide an example of the augmented training of some embodiments by introducing the linear Lagrangian terms. For simplicity, the example uses only the linear Lagrangian term, and skips the quadratic penalty function. Each of the hidden layer nodes A and B receive a single input (from the input layer nodes I and J, respectively), with corresponding weight values $w_{AI}$ and $w_{BJ}$. The output layer node C receives its inputs from the outputs of nodes A and B, and uses weight values $w_{CA}$ and $w_{CB}$ respectively for its linear component. While the example network has only one hidden layer and four total weight coefficients, it should be understood that in practical use a typical network will have a far greater number of layers, nodes, and weights.

In the example network 500, all three of the nodes A, B, and C use the exponential linear unit (ELU) function for their non-linear activation functions:

$$ELU(x) = \begin{cases} x & \text{if } x \geq 0, \\ \exp(x) - 1 & \text{if } x < 0. \end{cases} \qquad (H)$$

For the use in backpropagation calculations, this activation function has the derivative:

$$\frac{\partial ELU(x)}{\partial x} = \begin{cases} 1 & \text{if } x \geq 0, \\ \exp(x) & \text{if } x < 0. \end{cases} \qquad (I)$$

For the loss function of the network 500, the example simply uses the output of node C (i.e., the optimal output of the network is 0). This simplifies the backpropagation calculations, as $$\frac{\partial L}{\partial C} = \frac{\partial C}{\partial C} = 1.$$

The constraint function used for each weight $w_{ik}$ is that given above, $h(w_{ik}) = w_{ik}*(1-|w_{ik}|)$, making the full loss function with the Lagrangian term:

$$\mathcal{L} = l + \Sigma_{ik} \lambda_{ik}(w_{ik}*(1-|w_{ik}|)) \qquad (J)$$

The following provides an example with specific values of $w_{AI}=0.3$, $w_{BJ}=-0.6$, $W_{CA}=-0.2$, and $w_{CB}=0.9$ prior to the first training iteration. The input values are input 1 (I)=0.5, input 2 (J)=0.7, and the Lagrangian multipliers are $\lambda_{AI}=1$, $\lambda_{BJ}=-1$, $\lambda_{CA}=-1$, and $\lambda_{CB}=0.2$. The training rate parameter r (for modifying the weight values) is 0.2 in this example.

For forward propagation in this example, the weight value $w_{AI}$ is rounded to 1.0. As this value (0.3) is located between 0 and 1, it can be randomly rounded to either of these values. In order to have an expectation value of 0.3, 70% of the time it should be rounded to 0 and 30% of the time it should be rounded to 1. In some embodiments, the weight values are rounded once for an entire training iteration (i.e., the all of the inputs are run through the network with the weight value at the same rounded value). As training typically involves many (e.g., thousands) such iterations, the weight will be rounded both up and down regularly over the course of the training. With the rounded weight value, the output of node A is 0.5. This is the rounded weight value $w_{AI}=1.0$ multiplied by input I=0.5. For positive values of x, the ELU simply outputs x.

The weight value $w_{BJ}=-0.6$ is rounded to −1.0 in this example. In addition, the output node weight values $W_{CA}=-$ 0.2 and $w_{CB}$=0.9 are rounded to 0.0 and 1.0, respectively. The output of node B (rounded to two decimal places) is −0.5. The rounded weight value $w_{BJ}$=−1.0, and this is multiplied by input J=0.7, to output −0.7. The ELU function gives exp(−0.7)−1=−0.50. Using these two outputs of A and B, as well as the two rounded weight values $w_{CA}$=0.0 and $w_{CB}$=1.0, the output of C's linear operator (again rounded to two decimal places) is −0.50. The ELU function for node C (i.e., the output of the network 500 for this example) provides exp(−0.50)−1=−0.40, which is also the value of the non-augmented loss function.

Next, backpropagation is performed to adjust the weight values of the network 500. The partial derivative $$\frac{\partial L}{\partial C} = 1,$$

as noted above. These partial derivatives for backpropagation also use the rounded weight values, in some embodiments (as opposed to the continuous weight values prior to rounding). Proceeding backwards through the network (in this notation, $dotprod_X$ is the output of node X's linear operator), the partial derivatives (without yet considering the Lagrangian terms) are:

$$\frac{\partial C}{\partial (dotprod_C)} = \frac{\partial ELU(dotprod_C)}{\partial (dotprod_C)} * 1 = \exp(-0.50) = 0.60$$

$$\frac{\partial C}{\partial W_{CA}} = \frac{\partial C}{\partial (dotprod_C)} A = 0.60 * 0.50 = 0.30$$

$$\frac{\partial C}{\partial W_{CB}} = \frac{\partial C}{\partial (dotprod_C)} B = 0.60 * (-0.50) = -0.30$$

$$\frac{\partial C}{\partial A} = \frac{\partial C}{\partial (dotprod_C)} W_{CA} = 0.60 * 0.0 = 0.0$$

$$\frac{\partial C}{\partial B} = \frac{\partial C}{\partial (dotprod_C)} W_{CB} = 0.60 * 1.0 = 0.60$$

$$\frac{\partial A}{\partial (dotprod_A)} = \frac{\partial ELU(dotprod_A)}{\partial (dotprod_A)} = 1.0$$

$$\frac{\partial A}{\partial W_{AI}} = \frac{\partial A}{\partial (dotprod_A)} I = 1.0 * 0.5 = 0.5$$

$$\frac{\partial C}{\partial W_{AI}} = \frac{\partial C}{\partial A} \frac{\partial A}{\partial W_{AI}} = 0.0 * 0.5 = 0.0$$

$$\frac{\partial B}{\partial (dotprod_B)} = \frac{\partial ELU(dotprod_B)}{\partial (dotprod_B)} = \exp(-0.70) = 0.50$$

$$\frac{\partial B}{\partial W_{BJ}} = \frac{\partial B}{\partial (dotprod_B)} J = 0.50 * 0.7 = 0.35$$

$$\frac{\partial C}{\partial W_{BJ}} = \frac{\partial C}{\partial B} \frac{\partial B}{\partial W_{BJ}} = 0.60 * 0.35 = 0.21$$

The partial derivatives of the combined loss function $\mathcal{L}$ with respect to the weights are then calculated. In some embodiments, the Lagrangian terms use the continuous weights rather than the rounded weights (as the rounded weights should result in zeroing out the Lagrangian terms). These partial derivatives, when including the Lagrangian terms, are:

$$\frac{\partial \mathcal{L}}{\partial W_{CA}} = \frac{\partial C}{\partial W_{CA}} + \lambda_{CA} \frac{\partial h(W_{CA})}{\partial W_{CA}} = 0.30 + (-1) * 0.60 = -0.30$$

$$\frac{\partial \mathcal{L}}{\partial W_{CB}} = \frac{\partial C}{\partial W_{CB}} + \lambda_{CB} \frac{\partial h(W_{CB})}{\partial W_{CB}} = -0.30 + 0.2 * (-0.8) = -0.46$$

-continued $$\frac{\partial \mathcal{L}}{\partial W_{AI}} = \frac{\partial C}{\partial W_{AI}} + \lambda_{AI} \frac{\partial h(W_{AI})}{\partial W_{AI}} = 0.0 + 1 * 0.4 = 0.40$$

$$\frac{\partial \mathcal{L}}{\partial W_{BJ}} = \frac{\partial C}{\partial W_{BJ}} + \lambda_{BJ} \frac{\partial h(W_{BJ})}{\partial W_{BJ}} = 0.21 + (-1) * (-0.2) = 0.41$$

These four terms represent the rate of change of the loss function (including the Lagrangian term) with respect to the variable parameters of the network 500, and thus indicate how these parameters should be updated. The updates to these parameters are also calculated using the continuous values, rather than the rounded values (as the continuous values are those that are actually being trained). After this round of training, the updates to the weight values are as follows:

$$W_{CA\_updated} = W_{CA} - r \frac{\partial \mathcal{L}}{\partial W_{CA}} = -0.2 - 0.2 * (-0.30) = -0.14$$

$$W_{CB\_updated} = W_{CB} - r \frac{\partial \mathcal{L}}{\partial W_{CB}} = 0.9 - 0.2 * (-0.46) = 0.99$$

$$W_{AI\_updated} = W_{AI} - r \frac{\partial \mathcal{L}}{\partial W_{AI}} = 0.3 - 0.2 * 0.40 = 0.22$$

$$W_{BJ\_updated} = W_{BJ} - r \frac{\partial \mathcal{L}}{\partial W_{BJ}} = -0.6 - 0.2 * 0.41 = -0.68$$

In this case, each of the weights are moved closer to whichever member of the set {−1, 0, 1} the particular weight started out nearest, owing in part to the Lagrangian term. However, depending on the nature of the network, in some cases even with the Lagrangian term included the weights may move away from the nearest member of their discrete candidate set, in order to reach a more optimal solution.

By using a set of discrete values, the use of large floating-point values for the weights in the multi-layer network as embedded into a physical device can be avoided. Instead, 1 or 2 bit values (if the options are 1, 0, and −1) may be used, which saves large amounts of memory in the aggregate, especially for networks that may have millions or even billions of weights. For example, ten million 32-bit values may be too large to store on a processing unit (e.g., of a smart phone, an IOT device, etc.) and would thus need to be stored in a separate memory and imported onto the processor at runtime, which uses input/output (I/O) bandwidth and thus power. If 1 and 2 bit values are used, however, this enables the data to be stored on the processor in some embodiments, thereby providing major power savings. To provide additional reduction in the overall data size, some embodiments use an additional constraint that requires that at least a particular percentage (e.g., 60%, 70%, etc.) of the weight values for a network be 0 (rather than −1 or 1).

Furthermore, when using floating-point or even variable-size weight values, the linear component of a node multiplies each input by its corresponding weight value. If all of the weight values are 1, 0, or −1, then this multiplication can be avoided and addition/subtraction used instead. Even if the positive/negative weight value for each layer of nodes is a value between 0 and 1, then this addition/subtraction technique can be used with one multiplication operation performed at the end. Because addition and subtraction is computationally easier than multiplication, this provides additional savings in processor resource consumption (and therefore power consumption).

Figure 6:
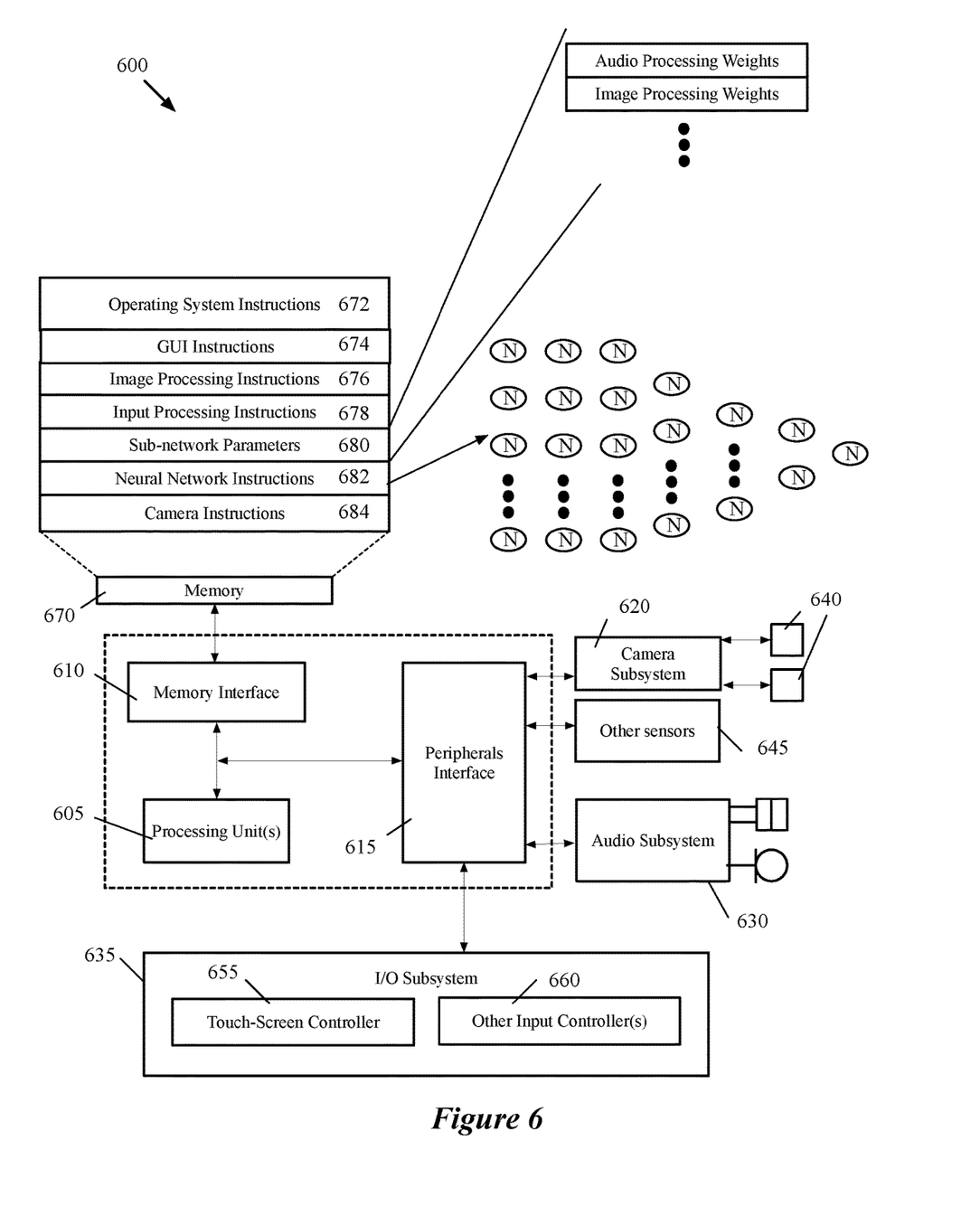
FIG. 6 illustrates an example of an architecture of a mobile computing device that stores neural network processing instructions, and multiple sub-networks that can be loaded into the processor for different purposes.

FIG. 6 is an example of an architecture 600 of a mobile computing device that stores neural network processing instructions, and multiple sub-networks that can be loaded into the processor for different purposes. Examples of mobile computing devices include smartphones, tablets, laptops, etc. As shown, the mobile computing device 600 includes one or more processing units 605, a memory interface 610 and a peripherals interface 615. While a mobile device is shown in this example, many of these principles apply to other types of devices that use neural networks. An IOT device, for instance, might have fewer subsystems and fewer types of stored instructions, to perform its specific purpose and have the ability to receive a single type of input that is evaluated with its neural network.

The peripherals interface 615 is coupled to various sensors and subsystems, including a camera subsystem 620, an audio subsystem 630, an I/O subsystem 635, and other sensors 645 (e.g., motion sensors), etc. The peripherals interface 615 enables communication between the processing units 605 and various peripherals. For example, an orientation sensor (e.g., a gyroscope) and an acceleration sensor (e.g., an accelerometer) can be coupled to the peripherals interface 615 to facilitate orientation and acceleration functions. The camera subsystem 620 is coupled to one or more optical sensors 640 (e.g., a charged coupled device (CCD) optical sensor, a complementary metal-oxide-semiconductor (CMOS) optical sensor, etc.). The camera subsystem 620 and the optical sensors 640 facilitate camera functions, such as image and/or video data capturing.

The audio subsystem 630 couples with a speaker to output audio (e.g., to output voice navigation instructions). Additionally, the audio subsystem 630 is coupled to a microphone to facilitate voice-enabled functions, such as voice recognition (e.g., for searching), digital recording, etc. The I/O subsystem 635 involves the transfer between input/output peripheral devices, such as a display, a touch screen, etc., and the data bus of the processing units 605 through the peripherals interface 615. The I/O subsystem 635 includes a touch-screen controller 655 and other input controllers 660 to facilitate the transfer between input/output peripheral devices and the data bus of the processing units 605. The touch-screen controller couples with a touch screen (not shown) to detect contact and movement on the touch screen using any of multiple touch sensitivity technologies. The other input controllers 660 are coupled to other input/control devices, such as one or more buttons.

In some embodiments, the device includes wireless communication subsystem (not shown in FIG. 6) to establish wireless communication functions. In some embodiments, the wireless communication subsystem includes radio frequency receivers and transmitters, and/or optical receivers and transmitters. These receivers and transmitters of some embodiments are implemented to operate over one or more communication networks such as a GSM network, a Wi-Fi network, a Bluetooth network, etc.

The memory interface 610 is coupled to memory 670. In some embodiments, the memory 670 includes volatile memory (e.g., high-speed random access memory), non-volatile memory (e.g., flash memory), a combination of volatile and non-volatile memory, and/or any other type of memory. As illustrated in FIG. 6, the memory 670 stores an operating system (OS) 672. The OS 672 includes instructions for handling basic system services and for performing hardware dependent tasks.

The memory 670 also stores various sets of instructions, including (1) graphical user interface instructions 674 to facilitate graphic user interface processing; (2) image processing instructions 676 to facilitate image-related processing and functions; (3) input processing instructions 678 to facilitate input-related (e.g., touch input) processes and functions; and (4) camera instructions 684 to facilitate camera-related processes and functions. The processing units 610 execute the instructions stored in the memory 670 in some embodiments.

In addition, the memory 670 stores generic neural network instructions 682, for implementing a machine-trained network of some embodiments of the invention. The memory also stores multiple sets of sub-network parameters 680, including at least a set of weight values for an audio-processing network and a set of weight values for an image-processing network. These multiple sets of weights may be used by the processing units 610 when executing the neural network instructions 682 to perform a specific purpose (e.g., audio processing, image processing, etc.). If a larger number of the weight values for each network are 0, this simplifies the processing for each sub-network, as many of the edges (and possibly entire nodes) will effectively drop out.

The memory 670 further stores communication instructions to facilitate communicating with one or more additional devices. The instructions described above are merely exemplary and the memory 670 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

The memory 670 may represent multiple different storages available on the device 600. For example, in some embodiments, the memory 670 includes processor registers, multiple levels of processor caches (e.g., the L0 micro-operations cache, L1 instruction cache, L1 at a cache, etc.), main memory (e.g., RAM), disk storage, etc. In some embodiments, the use of a discrete set of 1-bit and 2-bit weight values enables the storage of multiple sets of sub-network parameters in a limited-storage device, and in some cases in the memory closest to the processing units 605 in order to optimize the neural network processing. For instance, some embodiments store one or more sets of weight parameters 680 in one of the levels of processor caches, so that the data is quickly accessible and does not need to be loaded onto the processor to evaluate an input.

While the components illustrated in FIG. 6 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 6 may be split into two or more integrated circuits.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
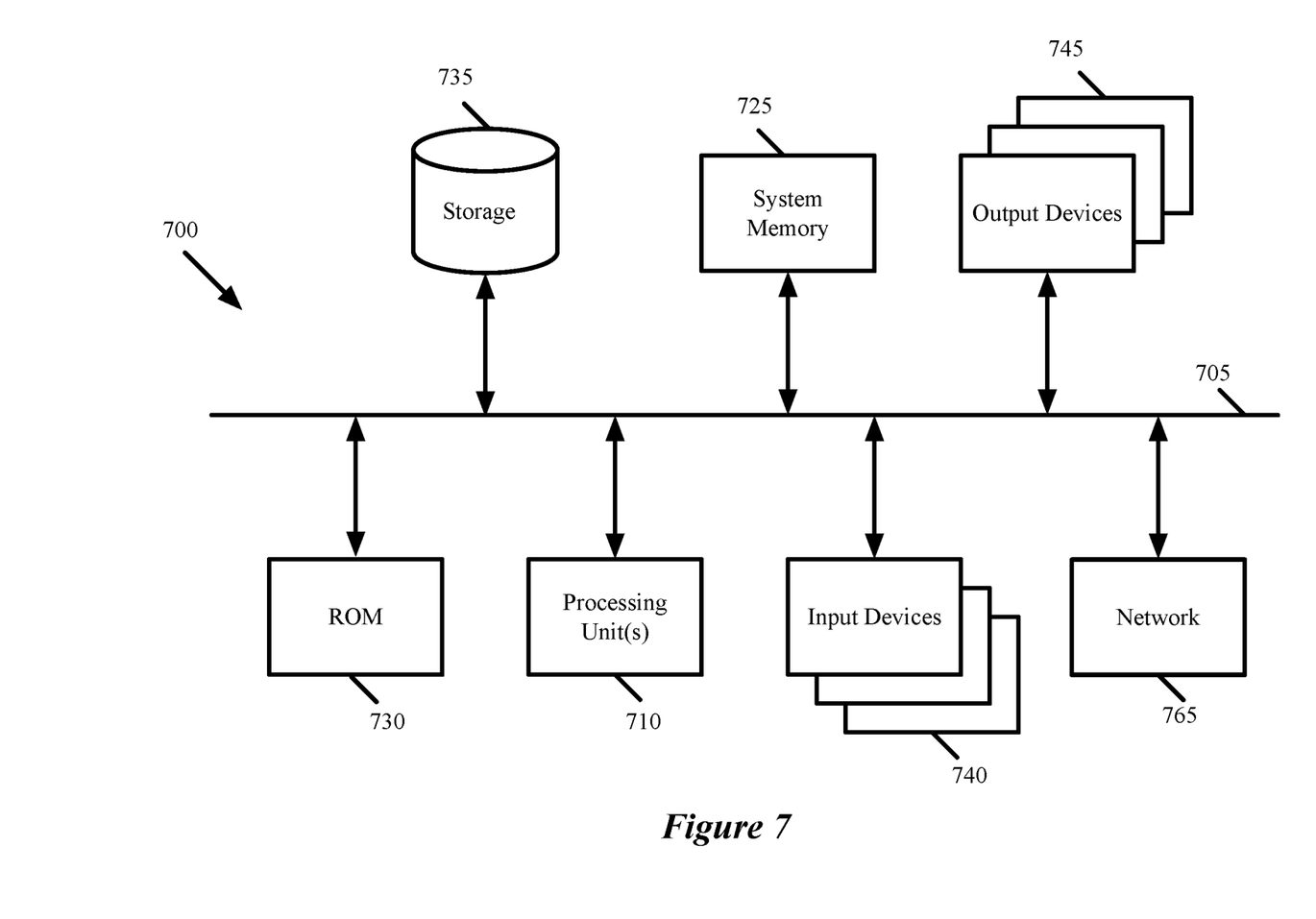
FIG. 7 conceptually illustrates an electronic system with which some embodiments of the invention are implemented.

FIG. 7 conceptually illustrates an electronic system 700 with which some embodiments of the invention are implemented. The electronic system 700 can be used to execute any of the control, virtualization, or operating system applications described above. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieves instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such as a random access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieves instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1 and 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. An electronic device comprising:
   a set of processing units; and
   a set of machine-readable media storing:

sets of instructions for applying a network of computation nodes to an input received by the device, wherein the network of computation nodes comprises a plurality of layers of nodes; and a set of machine-trained weight parameters for configuring the network to perform a specific function, wherein (i) each layer of nodes has an associated value, (ii) each of the weight parameters is associated with a computation node, (iii) each weight parameter is zero, the associated value for the layer of the computation node with which the weight parameter is associated, or the negative of the associated value for the layer of the computation node with which the weight parameter is associated, and (iv) each weight value is stored using two bits or less of data.

2. The electronic device of claim 1, wherein each of the weight parameters is stored as either 1, 0, or −1.

3. The electronic device of claim 2, wherein the weight parameters stored as 0 are stored using one bit of data and the weight parameters stored as 1 or −1 are stored using two bits of data.

4. The electronic device of claim 2, wherein the set of instructions for applying the network of computation nodes comprises, for a particular computation node belonging to a particular layer, sets of instructions for:

performing a set of calculations using a set of input values and the stored weight parameter values of 0, 1, and −1 to generate an intermediate result; and multiplying the intermediate result by the associated value for the particular layer.

5. The electronic device of claim 4, wherein the set of calculations are performed using only addition without requiring multiplication, wherein the multiplication by the associated value is a single multiplication operation for the particular computation node.

6. The electronic device of claim 1, wherein the electronic device is a mobile device.

7. The electronic device of claim 1, wherein the set of machine-readable media comprises a set of caches associated with the processing units and a main memory.

8. The electronic device of claim 7, wherein the sets of machine-trained weight parameters are stored in a cache closest to the set of processing units.

9. The electronic device of claim 1, wherein the electronic device is an Internet-of-Things (IOT) device.

10. The electronic device of claim 1, wherein the weight parameters are quantized during training.

11. The electronic device of claim 1, wherein the input received by the device comprises an image.

12. The electronic device of claim 1, wherein the input received by the device comprises voice audio.

13. The electronic device of claim 7, wherein the sets of machine-trained weight parameters are stored in the set of caches.

14. The electronic device of claim 1, wherein at least a predefined percentage of the machine-trained weight parameters are set to 0 during training.

15. The electronic device of claim 1, wherein the network of computation nodes comprises a layer of input nodes, a layer of output nodes, and a plurality of layers of interior nodes, wherein each node produces an output value and each interior node and output node receives as input values a set of output values of the computation nodes of a previous layer.

16. The electronic device of claim 15, wherein the set of machine-trained weight parameters comprises, for each interior node and output node, a separate weight value for each input value received by the node.

17. The electronic device of claim 1, wherein each of a plurality of the computation nodes comprises (i) a linear function using the machine-trained weight parameters and (ii) a non-linear function.

18. The electronic device of claim 17, wherein each node uses a same non-linear function.

19. The electronic device of claim 17, wherein at least two nodes in the network use different non-linear functions.

* * * * *